(No Model.)  2 Sheets—Sheet 1.

C. H. EMERY.
CAN HOLDING FRAME FOR USE WITH CAN TESTING MACHINES.

No. 475,446.  Patented May 24, 1892.

Witnesses:
John L. Jackson
Nellie McKibben

Inventor:
Charles H. Emery
by Bond, Adams & Pickard
Attorneys (No Model.) 2 Sheets—Sheet 2.
C. H. EMERY.
CAN HOLDING FRAME FOR USE WITH CAN TESTING MACHINES.
No. 475,446. Patented May 24, 1892.
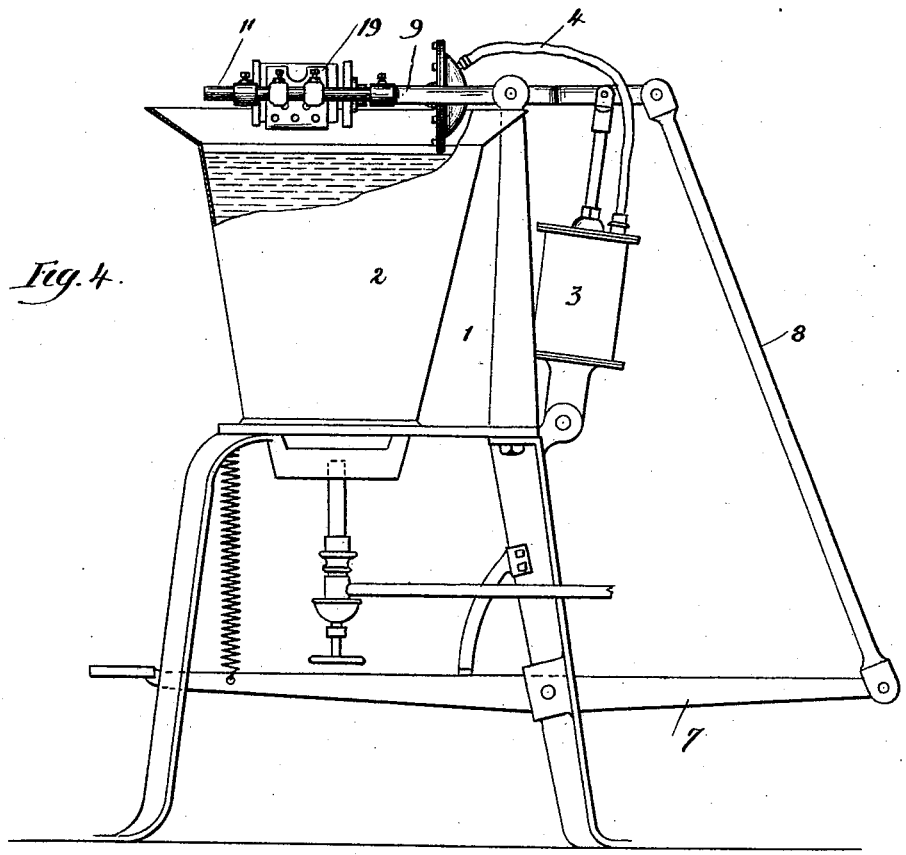
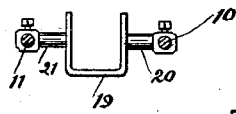
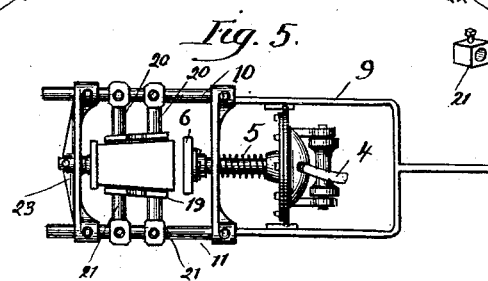
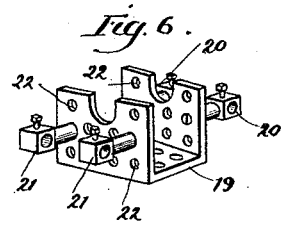

UNITED STATES PATENT OFFICE.

CHARLES H. EMERY, OF CHICAGO, ILLINOIS, ASSIGNOR TO HIMSELF AND CHARLES P. LIBBY, OF SAME PLACE.

CAN-HOLDING FRAME FOR USE WITH CAN-TESTING MACHINES.

SPECIFICATION forming part of Letters Patent No. 475,446, dated May 24, 1892.

Application filed February 23, 1892. Serial No. 422,382. (No model.)

*To all whom it may concern:*

Be it known that I, CHARLES H. EMERY, a citizen of the United States, residing at Chicago, in the county of Cook and State of Illinois, have invented certain new and useful Improvements in Can-Holding Frames for Use with Can-Testing Machines, of which the following is a specification, reference being had to the accompanying drawings, in which—

Figure 3:
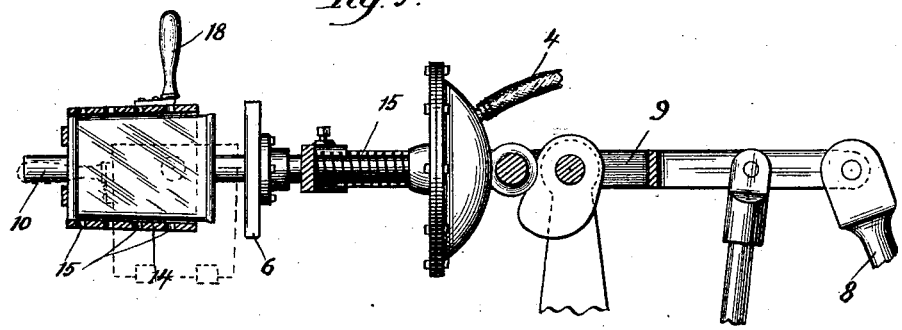
Figure 2:
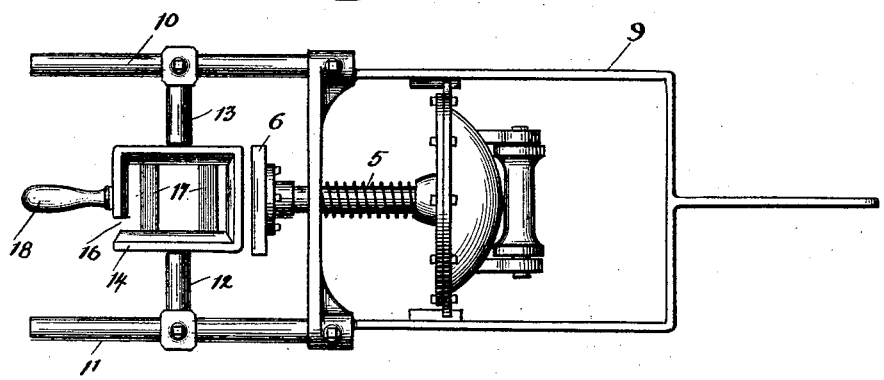
Figure 1:
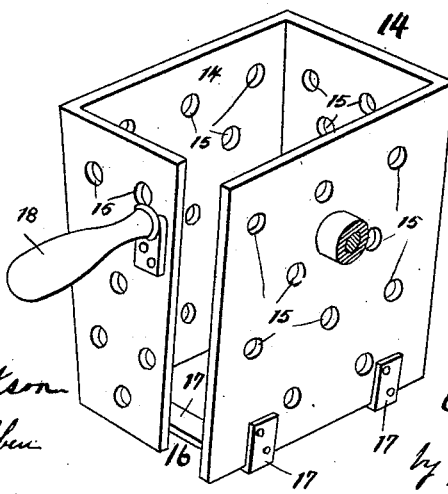

Figure 1 is a perspective view of my improved frame. Fig. 2 is a top or plan view of a testing-machine, showing the manner of mounting my improved frame and its position when not in use. Fig. 3 is a side elevation of a portion of a can-testing machine, showing the frame is use, the frame being in section. Fig. 4 is a side elevation of a can-testing machine, showing a modification of the frame. Fig. 5 is a top or plan view of the same. Fig. 6 is a perspective view of the modification of the frame, and Fig. 7 is an end view.

My invention relates to machines for testing cans by the use of compressed air, and particularly to devices for holding the cans while undergoing the operation of testing. In one form of testing-machines the cans are filled with compressed air at a pressure of from twenty to forty pounds to the square inch, and are then immersed in water, the leaks being indicated by the bubbles caused by the escape of air from the can. Such machines have generally been used for testing cans circular in cross-section, and in such cans air under sufficient pressure could be used to make the operation of testing a sufficiently accurate one. With square cans or cans polygonal in cross-section the operation of testing could not be satisfactorily done by the use of the machine referred to, for the reason that if air under sufficient pressure to quickly show the leaks were introduced into the cans the sides of the can would be caused to bulge, and for this reason it has heretofore been impossible to test cans as above described, as air at a low pressure only could be used.

The object of my invention is to provide a new and improved device for holding the cans when subjected to high air-pressure, which will be so constructed as to hold the can in its proper shape, while it will permit the air to escape from any leaks which might happen to be in the can. I accomplish this object as hereinafter specified and as illustrated in the drawings. That which I regard as new will be pointed out in the claims.

In the drawings, 1 indicates a can-testing machine, which is adapted to test cans by compressed air, as above described.

The essential parts of the machine are the tank 2, adapted to contain water, an air-pump 3, and pipe 4 for conducting air from the air-pump to a tube 5 for conducting compressed air to the can.

6 indicates a plate connected to the tube 5, which plate is adapted to fit tightly upon the end of the can, and is provided with suitable gaskets to form an air-tight connection.

7 indicates a lever for operating the machine, which lever is connected by means of a connecting-rod 8 to a frame 9, mounted over the tank 2, as best shown in Fig. 4. The frame 9 carries two parallel rods 10 11, adapted to receive inwardly-projecting bars 12 13, which support the can-holding frame.

As the construction and operation of the testing-machine forms no part of my invention I will not further describe it. The machine shown, however, is substantially similar to that shown and described in Letters Patent granted to W. H. H. Stevenson, No. 445,706, dated February 3, 1891.

In that form of my invention designed for use with large cans the can is carried in a frame 14, which is of the shape of the can and is open at the top and bottom, as shown in Fig. 1. The frame shown is designed for use with common cubical cans used for packing meats. The frame 14 is made of iron or steel, and is provided with a number of perforations 15, as shown.

16 indicates an opening left in one side of the frame 14, which opening is at such a point as to expose the side seam of the can when it is placed in the frame, the object of which will be hereinafter set forth.

17 indicates cross-bars, which extend transversely across the frame 14 at its lower end and are adapted to support the can. The frame 14 is trunnioned or pivoted between the inwardly-projecting bars 12 13, carried by the rods 10 11, as best shown in Fig. 2, and the bars 12 and 13 are movably secured upon the rods 10 and 11, so that they may be adjusted at a greater or less distance from the plate 6 to adapt them for use with cans of different sizes.

18 indicates a handle secured to one side of the frame 14, as shown, by means of which the frame 14 may be readily turned to present the head of the can to the plate 6. The frame 14 is made of such size that the can to be tested will fit closely into it, the upper end of the can being exposed so that the plate 6 may come in contact with it.

In testing a can by the use of my improved frame the can is put into the frame, the side seam of the can lying opposite the opening 16. The frame is turned to the position shown in Fig. 2 to permit of the insertion of the can. The frame is then turned to a horizontal position, as shown in Fig. 3, bringing the head of the can opposite the plate 6, when by suitable mechanism the plate 6 is moved into contact with the upper end of the can, and forms an air-tight joint. Air is then introduced into the can and the can is immersed in water in the tank 2. Any leaks which happen to be in the can are exposed by the air-bubbles. The can is afterward removed. The perforations 15 permit air to escape from leaks in the sides of the can, while air passing through leaks in the seams at the ends of the can is free to escape at the ends of the frame.

By the use of my improved frame air may be used at a much higher pressure, thereby rendering it practicable to test cans of any size or shape by the use of the machine described, as a frame of suitable shape may readily be fitted to the machine.

In Figs. 4, 5, 6, and 7 I have shown a modification of my improved frame having only three sides. A frame 19, having only three sides, is designed for use with smaller cans, as in such cases by protecting three of the sides of the can the fourth side will be sufficiently protected to prevent the can from being injured.

Instead of mounting the frame 19 on trunnions I have shown it as rigidly secured to cross-bars 20 and 21, which are adjustably secured upon the rods 10 and 11. The bottom of the can bears against a cross-bar 23, rigidly secured to the bars 10 and 11. The frame 19 is also provided with perforations 22, as shown in Fig. 6. I prefer to use the construction shown in Fig. 6 with small cans, for the reason that it is somewhat more convenient.

That which I claim as my invention, and desire to secure by Letters Patent, is—

1. The combination, with a can-testing machine of the class described, of a frame adapted to receive and hold a can, said frame being adapted to fit around said can to support the sides of the can against internal pressure, substantially as described.

2. The combination, with a can-testing machine of the class described, of a frame adapted to receive and support a can, said frame having sides adapted to fit around the sides of the can, and perforations in said sides, substantially as and for the purpose specified.

3. The combination, with a can-testing machine of the class described, of a frame adapted to receive and support a can, said frame having sides adapted to fit around the sides of the can, and an opening in said frame adapted to expose the side seam of the can, substantially as described.

4. The combination, with a can-testing machine of the class described, of parallel rods 10 and 11, and a frame adjustably pivoted between said rods, said frame being adapted to receive and support a can, substantially as described.

5. The combination, with a can-testing machine of the class described, of a frame 14, having perforations 15, cross-bars 17, and opening 16, substantially as described.

CHARLES H. EMERY.

Witnesses:
JOHN L. JACKSON,
CHARLES E. PICKARD.